United States Patent
Todorovic (10) Patent No.: US 11,752,426 B2
(45) Date of Patent: Sep. 12, 2023

(54) PEER-TO-PEER MULTIPLAYER CLOUD GAMING ARCHITECTURE

(71) Applicant: GOOGLE LLC, Mountain View, CA (US)

(72) Inventor: Michal Todorovic, Huntington Beach, CA (US)

(73) Assignee: GOOGLE LLC, Mountain View, CA (US)

( * ) Notice: Subject to any disclaimer, the term of this patent is extended or adjusted under 35 U.S.C. 154(b) by 175 days.

(21) Appl. No.: 17/604,022

(22) PCT Filed: Mar. 10, 2021

(86) PCT No.: PCT/US2021/021734
§ 371 (c)(1),
(2) Date: Oct. 15, 2021

(87) PCT Pub. No.: WO2021/183664
PCT Pub. Date: Sep. 16, 2021

(65) Prior Publication Data
US 2022/0212101 A1   Jul. 7, 2022

Related U.S. Application Data

(60) Provisional application No. 62/989,003, filed on Mar. 13, 2020.

(51) Int. Cl.
*A63F 13/33* (2014.01)
*A63F 13/34* (2014.01)
(Continued)

(52) U.S. Cl.
CPC .............. *A63F 13/33* (2014.09); *A63F 13/34* (2014.09); *A63F 13/352* (2014.09); *A63F 13/355* (2014.09); *A63F 13/44* (2014.09)

(58) Field of Classification Search
CPC ........ A63F 13/33; A63F 13/34; A63F 13/352; A63F 13/355; A63F 13/44
See application file for complete search history.

(56) References Cited

U.S. PATENT DOCUMENTS 6,570,563 B1 *  5/2003  Honda ................. A63F 13/352
                                                345/473
7,293,235 B1 * 11/2007  Powers .................... G06T 7/20
                                                463/9
(Continued)

FOREIGN PATENT DOCUMENTS

EP       1519531 A2    3/2005
EP       1821487 B1    4/2010

OTHER PUBLICATIONS

Australian Examination Report No. 1 for standard patent application dated Feb. 16, 2023 for AU Application No. 2021236140, 2 pages.

(Continued)

*Primary Examiner* — William H McCulloch, Jr.

(57) ABSTRACT

A cloud gaming system includes a messaging bus and a plurality of servers that are interconnected via the messaging bus and communicatively coupled to one or more client devices. Each server executes a game simulation instance for each of one or more players associated with one of the client devices. Each game simulation instance associated with a player within a specified region of a game world communicates player input by the player to one or more other game simulation instances via an ad-hoc peer-to-peer network formed between multiple game simulation instances associated with players within the specified region. Each game simulation instance associated with a player within the specified region also calculates a current state for the player based on the player inputs received via the ad-hoc peer-to-peer network.

31 Claims, 4 Drawing Sheets

(51) Int. Cl.
*A63F 13/355* (2014.01)
*A63F 13/352* (2014.01)
*A63F 13/44* (2014.01)

(56) References Cited

U.S. PATENT DOCUMENTS

| | | | | |
|---|---|---|---|---|
| 7,927,217 | B2* | 4/2011 | Kimura | A63F 13/35 463/31 |
| 7,934,996 | B2* | 5/2011 | Aoyama | A63F 13/30 273/317.1 |
| 8,024,467 | B2* | 9/2011 | Humphrey | A63F 13/12 709/204 |
| 8,062,128 | B2* | 11/2011 | Jobe | A63F 13/10 463/31 |
| 8,066,571 | B2* | 11/2011 | Koster | A63F 13/79 463/43 |
| 8,147,339 | B1* | 4/2012 | Perry | A63F 13/355 463/31 |
| 8,203,561 | B2* | 6/2012 | Carter | A63F 13/12 345/475 |
| 8,339,392 | B2* | 12/2012 | Betzler | A63F 13/30 345/475 |
| 8,345,049 | B2* | 1/2013 | Hamilton, II | G06T 15/20 345/475 |
| 8,514,249 | B2* | 8/2013 | Hamilton, II | G06V 20/20 345/428 |
| 8,606,904 | B2* | 12/2013 | Waugaman | A63F 13/35 709/224 |
| 8,624,903 | B2* | 1/2014 | Hamilton, II | A63F 13/52 345/473 |
| 8,812,954 | B2* | 8/2014 | Shuster | G06T 19/006 345/473 |
| 9,067,150 | B2* | 6/2015 | Konkle | A63F 13/792 |
| 9,138,648 | B2* | 9/2015 | Gavin | A63F 13/60 |
| 9,220,982 | B2* | 12/2015 | Dun | A63F 13/358 |
| 9,233,304 | B2* | 1/2016 | Kurabayashi | A63F 13/35 |
| 9,433,862 | B2* | 9/2016 | Bruno, Jr. | A63F 13/352 |
| 9,675,890 | B2* | 6/2017 | Ahiska | A63F 13/358 |
| 2002/0119821 | A1* | 8/2002 | Sen | A63F 13/12 463/42 |
| 2004/0003039 | A1* | 1/2004 | Humphrey | A63F 13/71 709/204 |
| 2004/0143852 | A1* | 7/2004 | Meyers | A63F 13/12 463/43 |
| 2006/0010256 | A1* | 1/2006 | Heron | A63F 13/12 710/1 |
| 2008/0009352 | A1* | 1/2008 | Aoyama | A63F 13/12 463/43 |
| 2008/0108437 | A1* | 5/2008 | Kaarela | A63F 13/34 463/43 |
| 2008/0220878 | A1* | 9/2008 | Michaelis | A63F 13/31 463/43 |
| 2009/0186700 | A1* | 7/2009 | Konkle | G06Q 10/10 463/42 |
| 2009/0291761 | A1* | 11/2009 | Hata | A63F 13/10 463/42 |
| 2009/0307226 | A1* | 12/2009 | Koster | A63F 13/12 |
| 2009/0325712 | A1* | 12/2009 | Rance | A63F 13/34 463/42 |
| 2010/0070859 | A1* | 3/2010 | Shuster | G06T 15/08 715/706 |
| 2010/0146128 | A1* | 6/2010 | Kulkarni | A63F 13/12 709/228 |
| 2012/0004041 | A1* | 1/2012 | Pereira | H04L 65/80 463/42 |
| 2012/0059881 | A1* | 3/2012 | Koster | A63F 13/30 709/219 |
| 2013/0143669 | A1* | 6/2013 | Muller | A63F 13/795 463/42 |
| 2013/0210528 | A1* | 8/2013 | Pereira | H04L 47/365 463/42 |
| 2013/0290106 | A1* | 10/2013 | Bradley | G06Q 90/20 705/323 |
| 2013/0296045 | A1* | 11/2013 | Dun | A63F 13/12 463/31 |
| 2013/0344960 | A1* | 12/2013 | Perry | A63F 13/338 463/32 |
| 2014/0011595 | A1* | 1/2014 | Muller | A63F 13/35 463/42 |
| 2014/0031132 | A1* | 1/2014 | Wickett | G06Q 50/01 463/42 |
| 2014/0063004 | A1* | 3/2014 | Hamilton, II | G06T 19/00 345/419 |
| 2014/0071127 | A1* | 3/2014 | Shuster | G06T 7/20 345/420 |
| 2015/0126276 | A1* | 5/2015 | Bhogal | H04L 67/131 463/29 |
| 2015/0375103 | A1 | 12/2015 | George | |
| 2016/0121212 | A1* | 5/2016 | Dun | A63F 13/358 463/31 |
| 2016/0267721 | A1* | 9/2016 | Hamilton, II | H04N 21/2405 |
| 2017/0287199 | A1* | 10/2017 | Makinen | G06T 17/00 |
| 2017/0312632 | A1* | 11/2017 | Curley | A63F 13/573 |
| 2017/0354878 | A1 | 12/2017 | Posin | |
| 2018/0300197 | A1 | 10/2018 | Marron | |
| 2019/0018915 | A1 | 1/2019 | Harkness et al. | |
| 2022/0212101 | A1* | 7/2022 | Todorovic | A63F 13/355 |

OTHER PUBLICATIONS

Communication pursuant to Article 94(3) EPC dated Jan. 31, 2023 for corresponding European Application No. 21715422.8, 5 pages.
International Preliminary Report on Patentability dated Sep. 22, 2022 for corresponding International Application No. PCT/US2021/021734, 8 pages.
Translation of Indian Office Action dated Nov. 21, 2022 for Indian Application No. 202247026453, 6 pages.
International Search Report and Written Opinion dated Jul. 1, 2021 for corresponding International Application No. PCT/US2021/021734, 15 pages.
Gupta et al "Computation-Bandwidth Trading for Mobile Edge Computing", 2019 16th IEEE Annual Consumer Communications & Networking Conference (CCNC), IEEE, Jan. 11, 2019, 6 pages.
Zhao et al "Edge-Node Assisted Live Video Streaming: A Coalition Formation Game Approach", 2018 IEEE Globecom Workshops (GC WKSHPS), IEEE, Dec. 9, 2018, 6 pages.
Canadian Examiner's Report dated Apr. 4, 2023 for CA Application No. 3,154,489, 4 pages.

* cited by examiner

PEER-TO-PEER MULTIPLAYER CLOUD GAMING ARCHITECTURE

CROSS-REFERENCE TO RELATED APPLICATIONS

The present application is a U.S. National Stage under 35 U.S.C. § 371 of International Patent Application Serial No. PCT/US2021/021734, entitled "PEER-TO-PEER MULTIPLAYER CLOUD GAMING ARCHITECTURE" and filed on 10 Mar. 2021, which claims priority to U.S. Provisional Application No. 62/989,003, entitled "PEER-TO-PEER MULTIPLAYER CLOUD GAMING ARCHITECTURE" and filed on 13 Mar. 2010, the entireties of which are incorporated by reference herein.

BACKGROUND

Conventional client-server networks for multiplayer video games often are complex and costly to implement and to maintain as they require centralized servers to coordinate game state for all of the players as well as the staff to support such centralized servers. The expense and complexity of a centralized coordinating server often makes scaling the gameplay to a large number of geographically-distributed players difficult, and typically requires that game developers implement substantively different development approaches to provide both single player support and multiplayer support for the same game title.

BRIEF SUMMARY OF EMBODIMENTS

In one example, a cloud gaming system comprises a messaging bus and a plurality of servers that are interconnected via the messaging bus and that are each communicatively coupled via one or more networks to one or more client devices. Each server may execute a game simulation instance for each of one or more players of a plurality of players, with each respective player being associated with one of the one or more client devices. Each game simulation instance associated with a respective player within a specified region of a game world may communicate player input by the respective player to one or more other game simulation instances via an ad-hoc peer-to-peer network formed between multiple game simulation instances associated with players within the specified region. Each respective game simulation instance associated with a player within the specified region may calculate a current state for the respective game simulation instance based on player inputs received via the ad-hoc peer-to-peer network.

Each game simulation instance associated with a respective player within the specified region of the game world may further communicate player input by the respective player to one or more additional game simulation instances that are each respectively associated with an additional player within an additional region of the game world that is adjacent to the specified region. A first region of the game world may be associated with a first ad-hoc peer-to-peer network, such that to execute a first game simulation instance associated with a first player within the first region of the game world may include, responsive to one or more indications of a second player entering the first region from a second region, to facilitate a second game simulation instance that is associated with the second player to join the first ad-hoc peer-to-peer network. In the present context, "adjacency" can be based on a adjacency parameter respectively set for two (first and second) regions of the game world and being below an adjacency threshold value. For example, "adjacency" can thus represent a geographical adjacency within the game world, a logical adjacency in terms of gameplay (e.g., if distant regions are distant connected via portals that directly transport a player from one region to another), and the like.

To facilitate the second game simulation instance to join the first ad-hoc peer-to-peer network includes to provide information regarding the current state for the first game simulation instance to the second game simulation instance. To provide the information regarding the current state for the first game simulation instance may be performed in response to a request from the second game simulation instance. To facilitate the second game simulation instance to join the first ad-hoc peer-to-peer network may further include to communicate to the second game simulation instance one or more player inputs received by the first game simulation instance since the current state for the first game simulation instance was calculated.

In some implementations, the gameplay of the game world may dependent on player input. As such, nothing occurs in a region of the game world when there are no players in that region to influence it. This may result in the gameplay for the region reverting to a default state when all players leave the region. Alternatively, the state for a region may be stored to a cloud drive or other network-accessible storage when the last player leaves the region, and then that state is reloaded when a player comes to the area. This may (further) support a game world that maintains state, but without coordinating game servers.

Each respective game simulation instance may store one or more snapshots of state information for the respective game simulation instance, such that to calculate a current state for the respective game simulation instance based on player inputs may include to roll back the current state of the respective game simulation instance to a most recent one of the one or more snapshots of state information responsive to receiving a player input.

To calculate a current state for the respective game simulation instance based on player inputs received via the ad-hoc peer-to-peer network may include to evaluate multiple player inputs to identify an earliest player input of the multiple player inputs; to modify the current state for the respective game simulation instance to a previous state that is associated with a time prior to the identified earliest player input; and to process the multiple player inputs in a chronological order. To calculate the current state may further include, after processing the multiple player inputs in the chronological order, to process any additional player input received since a latest player input of the multiple player inputs. To process the multiple player inputs in the chronological order may include to process the multiple player inputs based on a respective timestamp associated with each of the multiple player inputs.

Another example may comprise a method of operating a server of the cloud gaming system in the examples above.

Yet another example may comprise a non-transitory computer-readable storage medium storing executable instructions configured to manipulate at least one processor of a server to perform the method of operating a server of the cloud gaming system.

In another example, a method may comprise executing a game simulation instance for each of one or more respective players of a plurality of players, such that the executing of each respective game simulation instance includes providing indications of player input by the respective player to one or more other game simulation instances via an ad-hoc peerto-peer network formed between multiple game simulation instances associated with players within a specified region of a game world; receiving player inputs via the ad-hoc peer-to-peer network; and calculating a current state for the respective game simulation instance based on the player input by the respective player and on the received player inputs.

Executing each respective game simulation instance may further include communicating player input by the respective player to one or more additional game simulation instances that are each respectively associated with an additional player within an additional region of the game world that is adjacent to the specified region.

Executing at least one of the respective game simulation instances may further include, responsive to one or more indications of an additional player entering the specified region, facilitating an additional game simulation instance to join the ad-hoc peer-to-peer network, the additional game simulation instance being associated with the additional player. Facilitating the additional game simulation instance to join the ad-hoc peer-to-peer network may include providing information regarding the current state for the at least one respective game simulation instance to the additional game simulation instance. Providing the information regarding the current state for the at least one respective game simulation instance may be performed in response to a request from the additional game simulation instance. Facilitating the additional game simulation instance to join the ad-hoc peer-to-peer network may further include communicating to the additional game simulation instance one or more player inputs received by the at least one respective game simulation instance since the current state for the at least one respective game simulation instance was calculated.

Executing each respective game simulation instance may further include storing one or more snapshots of state information for the respective game simulation instance, such that calculating a current state for the respective game simulation instance based on player inputs may include rolling back the current state of the respective game simulation instance to a most recent one of the one or more snapshots of state information responsive to receiving a player input.

Calculating a current state for the respective game simulation instance based on player inputs may include identifying an earliest player input of multiple player inputs; modifying the current state for the respective game simulation instance to a previous state that is associated with a time prior to the identified earliest player input; and processing the multiple player inputs in a chronological order. Calculating the current state may further include, after processing the multiple player inputs in the chronological order, processing any additional player input received since a latest player input of the multiple player inputs. Processing the multiple player inputs in the chronological order may include processing the multiple player inputs based on a respective timestamp associated with each of the multiple player inputs.

In still another example, a gaming server may comprise one or more processors; one or more memories storing executable instructions configured to manipulate at least one of the one or more processors; a network interface communicatively coupled to a messaging bus and to one or more client devices; a simulation management module; and a state management module. The simulation management module may be to execute a first game simulation instance for a first player associated with a first client device of the one or more client devices, and to communicate player input by the first player to one or more other game simulation instances via a first ad-hoc peer-to-peer network formed between multiple game simulation instances associated with players within a specified region of a game world. The state management module may be to receive indications of player inputs via the first ad-hoc peer-to-peer network, and to calculate a current state for the first game simulation instance based on the indications of the player inputs.

The simulation management module may further be to communicate player input by the first player to one or more additional game simulation instances that are each respectively associated with an additional player within an additional region of the game world that is adjacent to the specified region.

The player may be within a first region of the game world that is associated with the first ad-hoc peer-to-peer network, such that the state management module is further to facilitate, responsive to one or more indications of a second player entering the first region from a second region, a second game simulation instance that is associated with the second player to join the first ad-hoc peer-to-peer network. To facilitate the second game simulation instance to join the first ad-hoc peer-to-peer network may include to provide information regarding the current state for the first game simulation instance to the second game simulation instance. To provide the information regarding the current state for the first game simulation instance may be performed in response to a request from the second game simulation instance. To facilitate the second game simulation instance to join the first ad-hoc peer-to-peer network may further include to communicate to the second game simulation instance one or more player inputs received by the first game simulation instance since the current state for the first game simulation instance was calculated.

The simulation management module may be further to store one or more snapshots of state information for the first game simulation instance, such that to calculate a current state for the first game simulation instance based on player inputs may include to roll back the current state of the first game simulation instance to a most recent one of the one or more snapshots of state information responsive to receiving a player input.

To calculate a current state for the first game simulation instance based on player inputs received via the first ad-hoc peer-to-peer network may include to evaluate multiple player inputs to identify an earliest player input of the multiple player inputs; to modify the current state for the first game simulation instance to a previous state that is associated with a time prior to the identified earliest player input; and to process the multiple player inputs in a chronological order. To calculate the current state may further include, after processing the multiple player inputs in the chronological order, to process any additional player input received since a latest player input of the multiple player inputs. To process the multiple player inputs in the chronological order may include to process the multiple player inputs based on a respective timestamp associated with each of the multiple player inputs.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate various systems and techniques for massively multiplayer cloud gaming that employs peer-to-peer networking for transmission of player input and game state between player game simulation instances executed by servers interconnected via a messaging bus and thereby avoiding the need to utilize a centralized game server for coordinating multiplayer operations. This approach mitigates the expense and complexity of maintaining coordinating servers, while also permitting game developers to more readily adapt a single-player configuration for a video game title to massively multiplayer gameplay.

Figure 1:
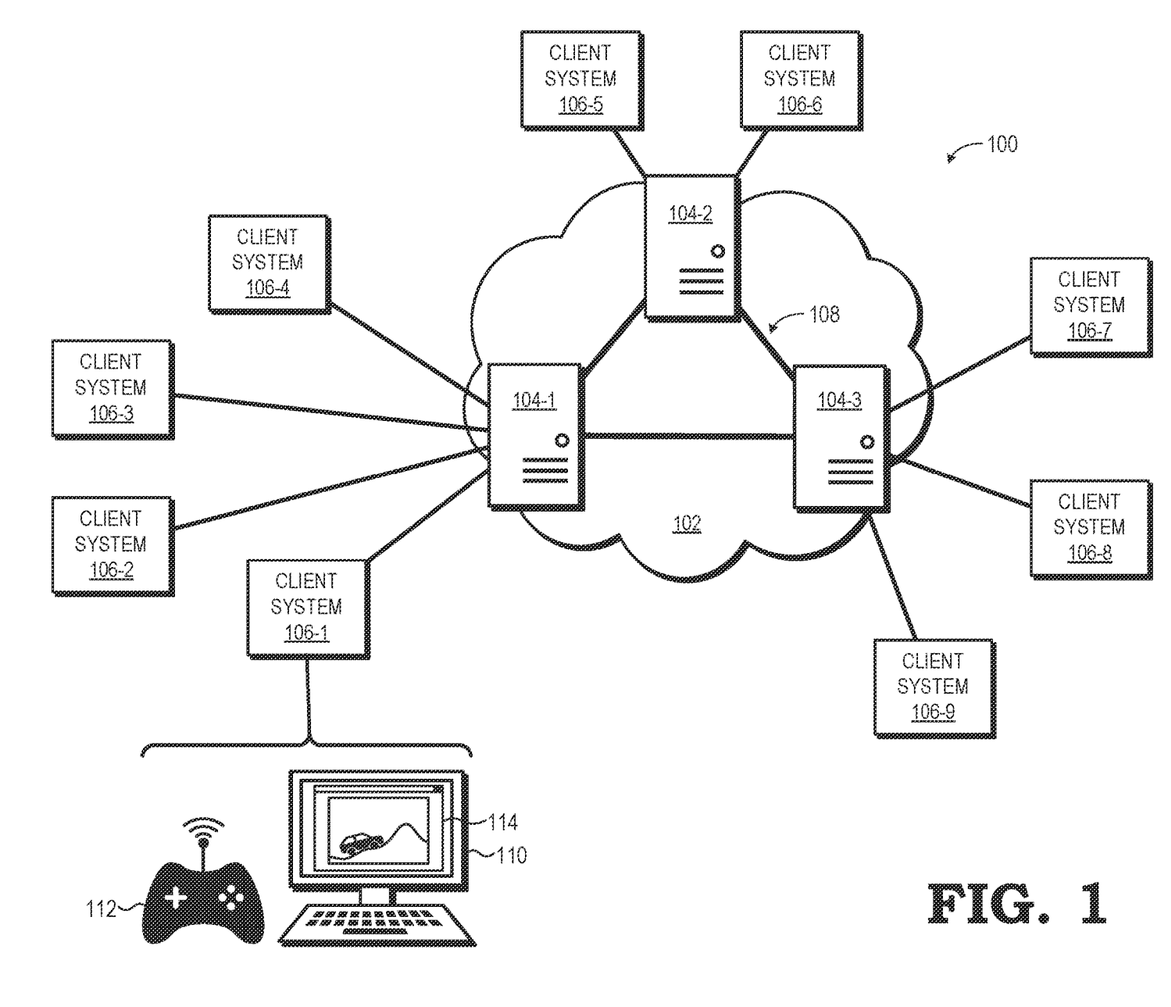
FIG. 1 is a block diagram illustrating a cloud gaming system facilitating multiplayer gaming via decentralized peer-to-peer player input and state messaging in accordance with some embodiments.

Turning to FIG. 1, a cloud gaming system 100 facilitating massive multiplayer gaming via peer-to-peer networking is illustrated in accordance with at least one embodiment. The cloud gaming system 100 includes a cloud platform 102 having a plurality of servers 104 that are coupled to corresponding subsets of a plurality of client devices 106 via one or more networks, such as the Internet. The servers 104, in turn, are interconnected via a high-bandwidth, low-latency inter-server messaging bus 108. The servers 104 typically are distributed in one or more data centers over a geographical area so as to reduce transmission latency through physical proximity. In the simplified example of FIG. 1, the cloud platform 102 includes three servers 104-1 to 104-3 supporting nine client devices 106-1 to 106-9, with client devices 106-1 to 106-4 served by server 104-1, client devices 106-5 and 106-6 served by server 104-2, and client devices 106-7 to 106-8 served by server 104-3. It will be appreciated that in a typical real-world implementation, the number of servers 104 and number of client devices 106 typically will be considerably higher.

As described below in greater detail with reference to FIG. 2, each server 104 operates to execute a corresponding game platform instance that facilitates execution of one or more simulation instances of a video game application for a corresponding player, each of these instances being referred to herein as a "player simulation instance." That is, the game platform instance provides various resources, such as communication/network management, resource management, media rendering encoding, and the like, so as to simulate execution of a video game application for a corresponding player as though that video game application was being played on a local gaming device, such as a personal computer (PC) or game console. Each player simulation instance thus represents execution, or simulation, of the video game for a corresponding player. To illustrate, a player instance can be considered to be a virtual game console; thus such instances are containers that enable a single game runtime including multiplayer networking, rendering, audio and video encoding, streaming and receipt of user inputs.

Each client device 106 represents the hardware and software resources utilized to receive player input through manipulation of one or more input/output devices for at least one player, as well as to present the video and auto content representing the visual and audial content, respectively, of the gameplay for the at least one player. Examples of a client device 106 include a desktop computer, a notebook computer, a tablet computer, a compute-enabled cellular phone (that is, a "smart phone"), a compute-enabled television (that is, a "smart TV"), and the like. As illustrated with reference to client device 106-1, each client device 106 includes a display 110, at least one game controller 112, one or more network interfaces to couple to the network connecting the client device 106 to the corresponding server 104, processors, memory, mass storage, speakers, and other computing resources to process the incoming media streams as is well known in the art.

The client device 106 receives video and audio streams (not shown) generated from execution of a corresponding player simulation instance at a corresponding server 104, and utilizes its compute, storage, and display resources for decoding and displaying the video frames of the transmitted video stream and for decoding and outputting the corresponding audio content. In some embodiments, the processing and display of video and audio content from the video game executed at the server 104 is facilitated by a software application executed at the client device 106 (and represented in FIG. 1 by graphical user interface (GUI) 114). This software application can include, for example, a cloud-gaming-specific software application. In other embodiments, a more general software application is utilized, and the video stream and audio stream are formatted and transmitted by the server 104 to be compatible with this software application. For example, in one embodiment the client device 106 utilizes a web browser that utilizes a hypertext markup language (HTML) format for display of the video content represented by the video and output of the audio content represented by the associated audio stream, and the server 104 provides the video stream in a format and the audio stream in formats compatible with the HTML format for display via the web browser.

Being interactive, the executing player simulation instance utilizes player input to at least partially direct the gameplay experience of a gaming session with the player. This player input is received at least in part through the game controller 112, which comprises any of a variety of I/O devices or a combination thereof, such as a game pad, joystick, keyboard, mouse, touchpad, trackball, steering wheel or yoke, pedal, dance pad, simulated gun, optical motion tracker, inertial sensor, light/laser source and detector, and the like. In some embodiments, the game controller 112 is tethered to the client device 106 such that player input data generated by a player's manipulation of the game controller 112 is provided to the corresponding server 104 via the client device 106. To illustrate, the game controller 112 can be wired or wirelessly connected to the client device 106 such that all data output by the game controller 112 is routed through a network interface between the client device 106 and the network connecting the client device 106 to the server 104. In other embodiments, the game controller 112 has a separate, independent network connection with the corresponding server 104 via a network. For example, the cloud gaming system 100 could employ a wireless local area network (WLAN) access point (not shown) local to the client device 106 and the game controller 112 and connected to the Internet, and wherein each of the client device 106 and the game controller 112 establishes a separate wireless connection with the WLAN access point to independently communicate with the corresponding server 104 over the Internet via the WLAN access point.

As a general overview of the cloud gaming system 100, the servers 104 leverage the high bandwidth and low latency of the inter-server messaging bus 108 to implement a massively multiplayer game through the use of a peer-to-peer infrastructure that allows coordination of gameplay between the individual player simulation instances supported by each game platform instance without necessitating centralized multiplayer gaming servers, and thereby eliminating the need for expensive server farms, server operation teams, and other expenses typically involved in supporting massively multiplayer games through conventional centralized techniques.

Figure 2:
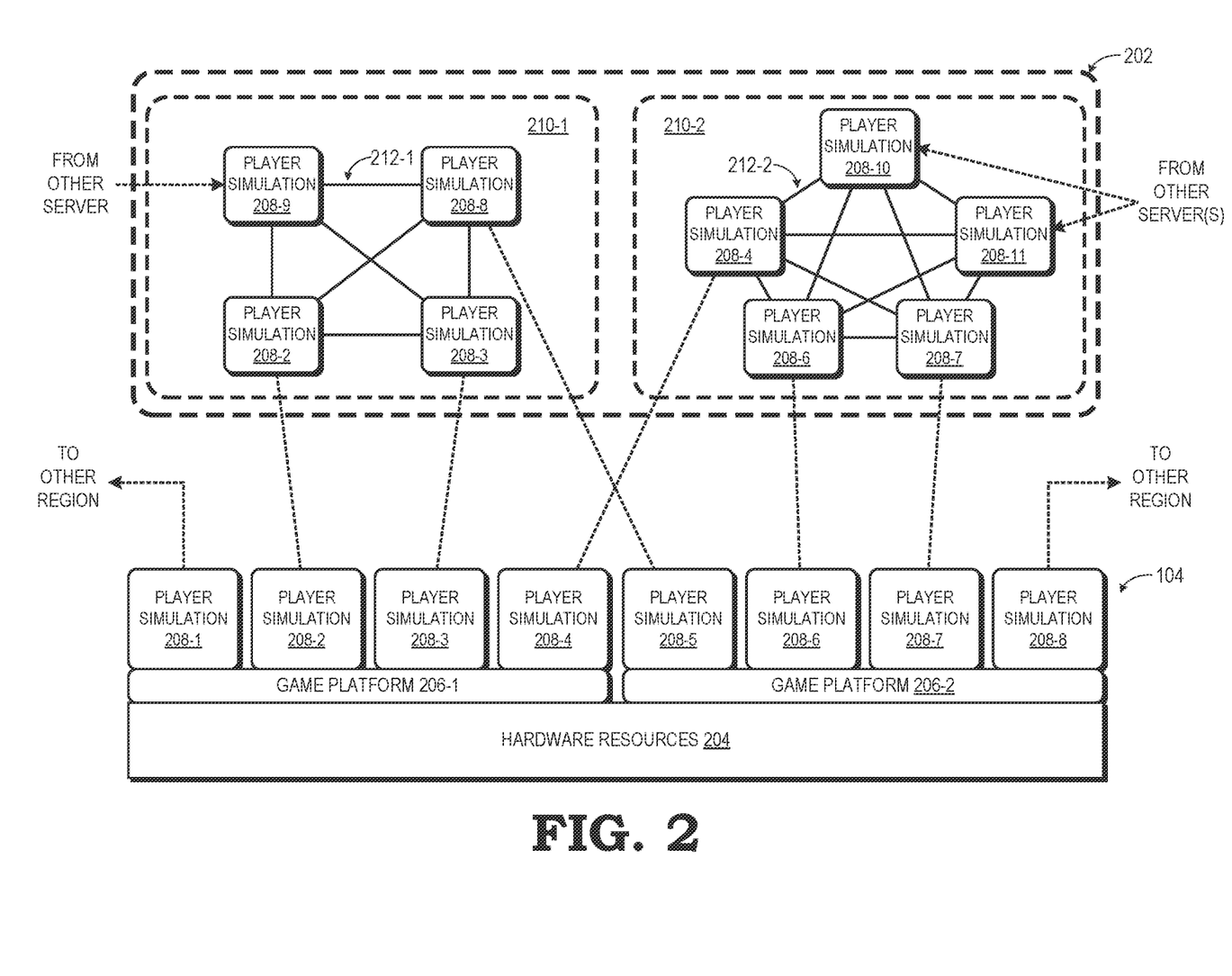
FIG. 2 is a block diagram illustrating an example configuration of player simulation instances of a server in corresponding regions of a game world in accordance with some embodiments.

To illustrate, FIG. 2 depicts an example high-level configuration of a server 104 as it relates to a corresponding multiplayer game world 202 of the multiplayer video game being supported by the cloud gaming system 100. In the depicted example, hardware resources 204 (e.g., processors, memory, network interfaces, mass storage devices, etc.) of the server 104 support the execution of one or more game platform instances 206, such as the two game platform instances 206-1 and 206-2 depicted in the illustrated example. Each game platform instance 206 in turn supports the execution of one or more player simulation instances 208, such as the player simulation instances 208-1 to 208-4 executed by the game platform instance 206-1 and the player simulation instances 208-5 to 208-8 executed by the game platform instance 206-1 in the illustrated example. Each player simulation instance 208 represents an instance of execution of the corresponding video game for a single corresponding player, and together the multiple player simulation instances 208 currently executing at all of the servers 104 of the cloud platform for the corresponding multiplayer video game together experience gameplay in the shared game world 202. As described in greater detail below, concurrent execution of the multiple player simulation instances 208 across all of the game platform instances 206 of all of the servers 104 utilizes a peer-to-peer infrastructure to communicate various information utilized to support the shared game world 202 among all of the players without a centralized game server. This information includes starting state information, state update information, player input, and the like.

To mitigate the volume of information flow and required processing for each game platform instance 206 and each player simulation instance 208, in at least one embodiment the game world 202 is logically partitioned into a plurality of regions 210. Each region 210 represents a particular geographical area or other logical division of the game world 202, and the boundaries of which can be determined using any of a variety of parameters or factors. To illustrate, in some embodiments, the game world 202 can be partitioned into a 2D array of specified compatible and adjoining shapes, such as squares, rectangles, triangles, hexagons, and the like. In other embodiments, the geographical layout of the game world 202 may dictate the regions 210. For example, if the game world 202 represents, for example, a multilevel military base on an alien world, each level of the military base could be identified as a separate region 210. Moreover, the number and size of the regions 210 can be influenced by the locations and number of players currently present in the game world 202. For example, a region 210 may have a specified maximum number of players and as the number of players in a particular area of the game world 202 increases, the number of regions 210 instantiated for that area may increase, while the area of each region 210 decreases, to maintain this upper threshold of players per region.

In the illustrated simple example, the game world 202 includes a multitude of regions, including the illustrated regions 210-1 and 210-2. Player simulation instances 208-2 and 208-3 supported by game platform instance 206-1 and player simulation instance 208-5 supported by game platform instance 206-2 are included in region 210-1, as is a player simulation instance 208-9 executed by a game platform instance 206 executed by a different server 104. Player simulation instance 208-4 executed by the game platform instance 206-1 and player simulation instances 208-6 and 208-7 executed by the game platform instance 206-2 are included in region 210-2, as are player simulation instances 208-10 and 208-11 executed by game platform instances 206 at other servers 104. The player simulation instances 208-1 and 208-8 are members of other regions (not illustrated) of the game world 202.

In this configuration, the player simulation instances 208-2, 208-3, 208-5, and 208-9 together form an ad-hoc peer-to-peer network 212-1 for the region 210-1 and the player simulation instances 208-4, 208-6, 208-7, 208-10, and 208-11 together form an ad-hoc peer-to-peer network 212-2. Each peer-to-peer network 212 is supported by the inter-server messaging bus 108 of the cloud platform 102 and used to transmit state information, player input information, and other multiplayer-execution information among the various members of the peer-to-peer network 212 to facilitate multiplayer gameplay for the corresponding region 210. Further, as players are likely to enter and leave particular regions 210 as gameplay progresses, in at least some embodiments, state information, player input information, and other multiplayer-facilitating information for adjacent regions is also communicated to the player simulation instances 208 of a given region 210, where "adjacency" can represent geographical adjacency, a logical adjacency in terms of the gameplay (e.g., if a region 210 includes a portal that transports a player to another geographically-distant region 210, the other region 210 connected via the portal may be considered to be "adjacent" in this context), and the like.

Figure 3:
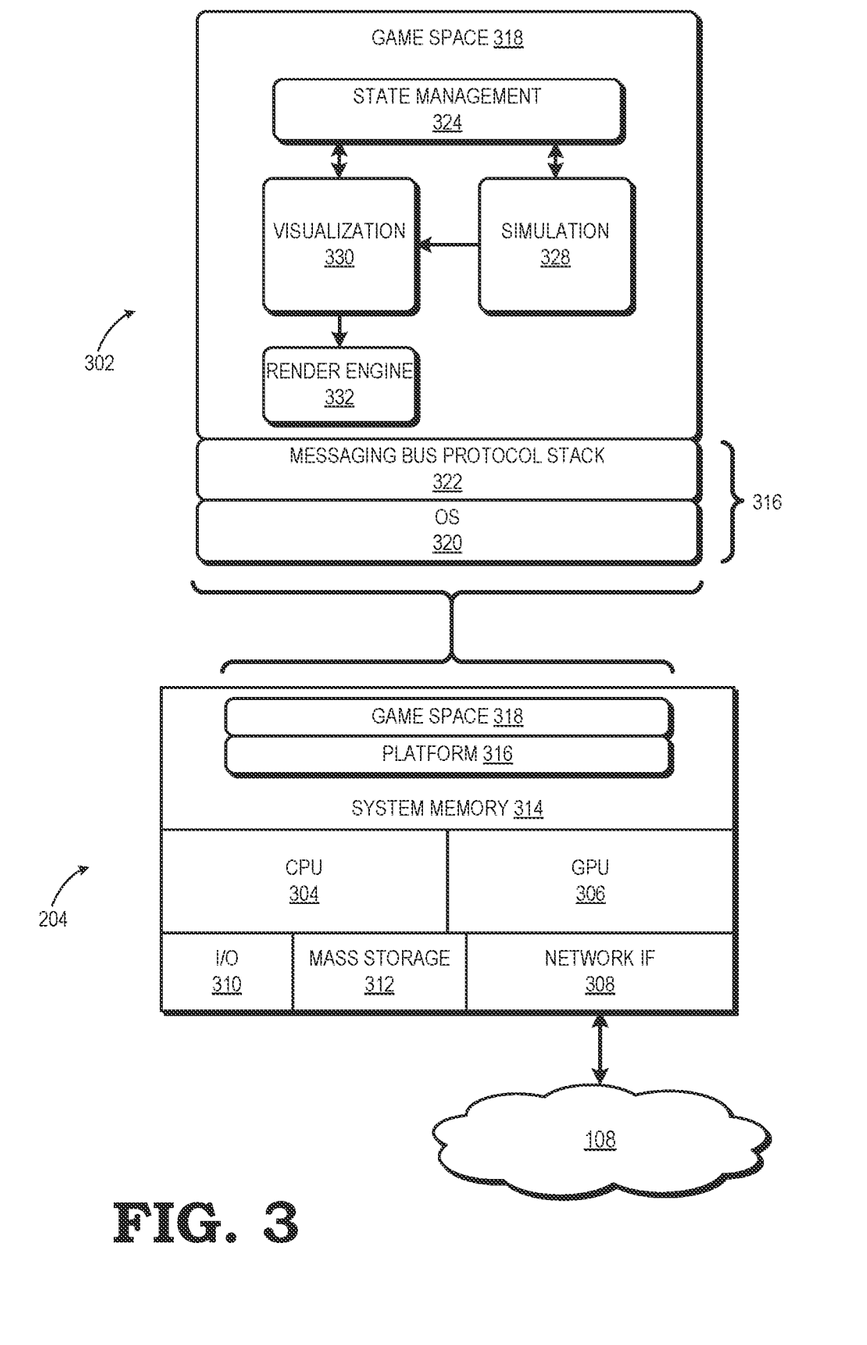
FIG. 3 is a block diagram illustrating a hardware configuration and software configuration of a server of the cloud gaming system of FIGS. 1 and 2 in accordance with some embodiments.

Turning now to FIG. 3, a general overview of the hardware resources 204 and a software configuration 302 of the server 104 of FIG. 2 are illustrated in accordance with some embodiments of the present disclosure. As depicted, the hardware resources 204 of the server 104 includes one or more processors, such as one or more central processing units (CPUs) 304, one or more graphics processing units (GPUs) 306, one or more artificial intelligence (AI) accelerator application-specific integrated circuits (ASICs)(not shown), and the like. The hardware resources 204 further include a network interface 308 coupled to the inter-server messaging bus 108, one or more input/output (I/O) devices 310, (such as a keyboard, mouse, or display), one or more mass storage devices 312 (such as a hard drive, optical disc drive, or network-attached storage), and the like. The hardware resources 204 further include at least one random access memory (RAM) or other system memory 314 accessible by the one or more processors. The system memory 314 stores one or more software applications that include program code representing executable instructions that manipulate the one or more processors to perform various operations described herein. These software applications include a set of one or more software applications collectively referred to as platform software 316 as well as a set of one or more software applications collectively referred to as game space software 318. Although illustrated and described separately, it will be appreciated that some or all of the functionality attributed in the following description to the platform software 316 can be implemented instead in the game space software 318, and vice versa.

As a general overview, the platform software 216 represents the software instructions executed to instantiate a game platform instance 206, which in turn facilitates execution of one or more player simulation instances 208, each of which represents a separate instantiation of execution of the game space software 318 and thus represents, at least in part, a video game application developed by a game developer. In some implementations, the game developer of the video game application specifically configures the video game application for execution by a server, in which case the platform software 316 provides one or more application programming interfaces (APIs) and other "hooks" that provide a more transparent interaction between the hardware resources 204 and the video game application. In other embodiments, the video game application is developed for a specific local hardware platform, such as a PC platform or a game console platform, in which case the platform software 316 emulates the typical interfaces between the video game application and its expected local hardware platform, and thus renders the actual underlying hardware resources 204 of the server 104 less transparent to the video game application. An example configuration of the platform software 316 and its interaction with the game space software 318 are illustrated by the software configuration 302.

In the depicted software configuration 302, the platform software 316 includes an operating system (OS) 320 or hypervisor and a messaging bus protocol stack 322, as well as other various modules for supporting cloud gaming executing as known in the art. The OS 320 operates to manage the overall operation of the server 104 and to act as an interface between the hardware components and the higher-level software layers. The messaging bus protocol stack 322 operates to facilitate operation of one or more ad-hoc peer-to-peer networks 212 that have as members those player simulation instances 208 executed by a game platform instance 206 executed by the platform software 316. This operation includes facilitating subscribe functions to allow player simulation instances 208 to join an ad-hoc network when entering the corresponding region 210, publish functions to allow player simulation instances 208 to distribute state information and player input information among the other member player simulation instances 208 of the ad-hoc peer-to-peer network for the joined region 210, and any peer-to-peer networks of adjacent regions 210, and the like.

As noted, the game space software 318 represents the software instructions executed at the server 104 to instantiate a player simulation instance 208. Accordingly, the game space software 318 includes a state management module 324, a simulation management module 328, a visualization module 330, and a render engine 332. The state management module 324 cooperates with the messaging bus protocol stack 322 to receive context information and player input information from other player simulation instances 208, and to provide context information and player input information from the corresponding player to other player simulation instances 208, as well as to format and provide this information to the simulation management module 328. The simulation management module 328 implements the game engine of the video game application and other title-specific configurations so as to simulate gameplay for the corresponding player utilizing the state information, player input information from the associated player, and player input information from other players in the same region 210. The visualization module 330 operates to visualize the current gameplay state into a 3D scene for the player with corresponding audio, and generates the draw commands and other audio and frame rendering commands to represent a stream of images and corresponding audio representing the player's viewpoint into the 3D scene, while the render engine 332 utilizes this stream of commands to render a corresponding video stream and audio stream that is then transmitted by the server 104 to the corresponding client device 106 for playback.

Figure 4:
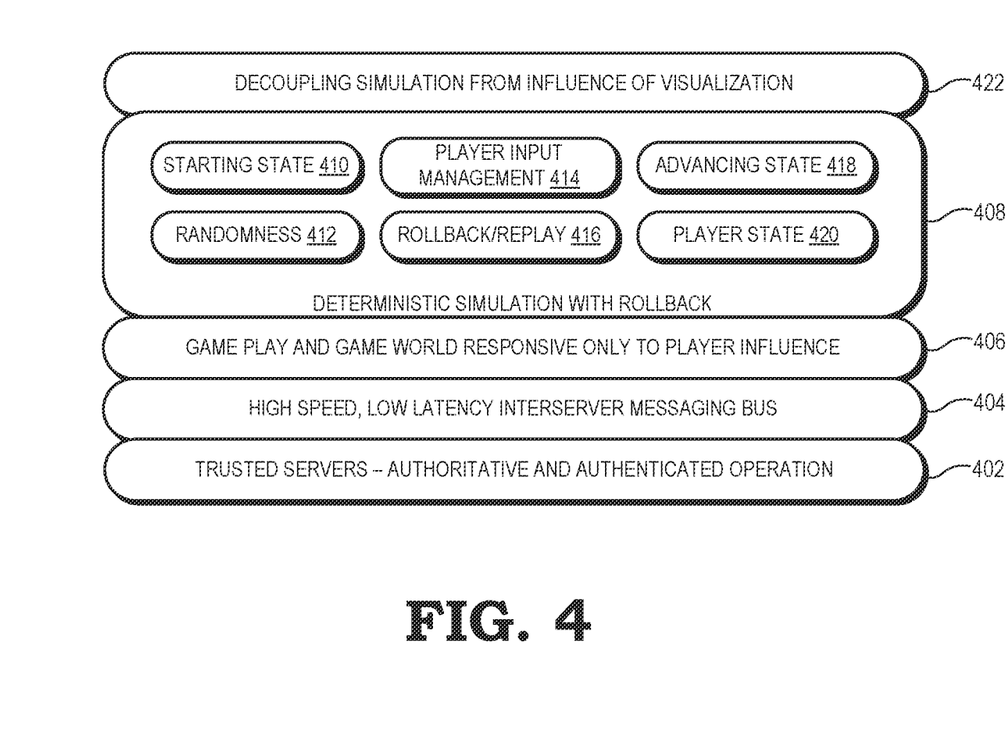
FIG. 4 is a diagram illustrating an approach to system implementation to provide decentralized massively peer-to-peer multiplayer gaming in accordance with some embodiments.

FIG. 4 is a diagram 400 illustrating various operational aspects of the platform software 316 and game space software 318 executed at the servers 104 of the cloud platform 102 so as to facilitate effective massively multiplayer gameplay without requiring a centralized server for multiplayer game coordination. As represented by block 402, one aspect that facilitates peer-to-peer multiplayer gameplay instead of centralized multiplayer game management is that the servers 104 of the cloud platform 102, and in many instances the entirety of the inter-server messaging bus 108, are managed by a single entity, and thus the game platform instances 206 and player simulation instances 208 executed thereon are trusted and thus their operations can be considered authoritative and authenticated. This aspect mitigates certain risks and exploitable features found in conventional peer-to-peer multiplayer games, such as problems related to the well-known look-ahead cheating problem in which a cheating client delays its own actions to await the messages from other players and modifying its own actions in response.

Another feature, as represented by block 404, is the utilization of the high-speed, low-latency inter-server messaging bus 108 connecting the servers 104 of the cloud platform 102, which allows the game platform instances 206 to set up join, leave, subscribe, and publish operations to rapidly and effectively transmit game state information and player input information between game platform instances 206 and between the player simulation instances 208 executed therewith.

An additional aspect, as represented by block 406, is that the gameplay of the game world 202 is dependent on player input. As such, nothing occurs in a region 210 of the game world when there are no players in that region to influence it. In some implementations, this results in the gameplay for the region 210 reverting to a default state when all players leave the region. Alternatively, the state for region 210 is stored to a cloud drive or other network-accessible storage when the last player leaves the region 210, and then that state is reloaded when a player comes to the area. This allows a world that maintains state, but without the coordinating game servers. Alternatively, the gameplay can be configured so that the state when players arrive in a region 210 can be simulated immediately relative to the perception of the players joining that region 210. This does not limit non-player characters (NPCs) and other game agents from being present in the game world 202 and performing various activities, but any such activities are limited to those that do not materially change the gameplay unless players are in the corresponding region. In particular, the publish and subscribe functions facilitate the implementation of the ad-hoc peer-to-peer networks between player simulation instances 208 for a given region 210 without requiring coordinating servers to distribute messages.

Yet another aspect, as represented by block 408, is enforcing deterministic game world simulation with simulation rollback. Some implementations of the cloud gaming system 100 are intended to permit game developers to design video games in a manner similar to designing a single-player experience while allowing multiplayer interactions. One feature that facilitates this design approach is to mandate deterministic game world simulation with rollback, in addition to having player input information being the primary network-transmitted data between game platform instances 206. Generally, as used herein, a game world simulation is "deterministic" when, given the same state and player inputs, two different game platform instances 206 executing the same game simulation, even if started at different times, will produce the same state within some specified threshold duration (typically in the hundreds of milliseconds range). To facilitate this deterministic operation, particularly while supporting simulation rollback, a number of factors are considered and solutions implemented, as described below.

As represented by block 410, one such factor is the starting state for the simulation. As the starting state for a simulation generally controls many subsequent state aspects, the starting state for a simulation is determined so that the starting point for each simulation instance will be the same even though the simulation instances typically will be started at different times. The determination of this starting state includes, for example, level geometry, NPC characteristics and state, object positioning, resources, and the like. That is, most or all aspects of the game world 202 are readily calculable.

As represented by block 412, another factor is the implementation of randomness. True randomness typically prevents deterministic simulation. Accordingly, to facilitate the deterministic simulation goal, in at least one embodiment any randomness implemented in the gameplay is permitted when it is "deterministic"; that is, apparent randomness to the player, but is deterministically calculated. To illustrate, many types of pseudo-random number generators are deterministic so long as the starting seed value is known. Thus, so long as each simulation instance uses the same pseudo-random number generator with the same staring seed and then maintains the same ordering of calls, each simulation instance should return the same or sufficiently similar values and thus maintain determinism. As an alternative, a sufficiently long, pre-generated list of seemingly random numbers can be generated to introduce deterministic "randomness", with the seed being the starting index in the list. Further, in the event of a rollback operation (described below), the mechanism employed for random number generation, in one embodiment, is capable of rolling back its state to the reset point of the rollback operation. Similarly, to return to a set starting state, an apparently random starting state can be employed by, for example, using the timestamp of an input from the first player entering the simulation for a corresponding region 210 as the seed for the random number generator, and every other instance within the same region 210 will receive this same value as part of the corresponding players initial state input.

Another such factor is player input management, as represented by block 414. As noted above, an aspect of at least one embodiment is that the only things that cause changes to the game simulation is player input; that is, without player input, the game simulation proceeds deterministically without need for network activity on the messaging bus 108. Accordingly, only with players in a given region 210 is the simulation for that region 210 created and advanced.

Because player input is what drives the simulations, the game platform instances 206 are configured so that each simulation processes all player input in the same way. This is accomplished, for example, by ensuring each simulation processes player input using the same time values, in the same order that the player input was performed. Thus, when a player performs an input, the game platform instance 206 connected to the client device 106 of the player to registers the player input, time stamps it, and sends that information across the messaging bus 108 to all of the other simulations in the same region 210 (and any designated "adjacent" regions 210). In some embodiments, even the simulation local to the player uses the networked version of the player input for processing the player input; this is because if there's anything different about how the player input is processed (for instance, a more accurate time value locally versus on the network) then the simulations are likely to drift. The local visualization of player input can use more accurate local data for the local player's benefit, but this is because the visualization is driven by the simulation and typically provides no feedback to the simulation.

When a simulation receives player input (whether from the local or a remote player; in at least one implementation the simulation does not distinguish between local and remote players), the simulation rolls back the simulation to the moment when the player input occurred if the timestamp was before the last time state was calculated. The simulation then applies all player input since the time of the rolled back state in order of their timestamps. If the received player input has a time stamp that occurs after the last time state was calculated, the player input is added to a list or other queue of player inputs to be processed in the order of their timestamps the next time state is calculated. In the event that two timestamps represent the same time, a deterministic tie breaker is applied, such as through the alphabetical ordering of player names or using a deterministic random number generator as described above. If a player input is time stamped into the future, the player input is added to a corresponding future input queue and executed later. In this way, relatively minor time variations between instances can be managed. Further, in some situations a player could send multiple inputs at the same time, and so in some embodiments the timestamping process ensures that the timestamp of each input is incremented by some small value to preserve ordering and further ensures that a client device 106 avoids sending more than one player input with the same timestamp. Further, to reduce the apparent latency of player input, in some implementations the timestamp of player input is set to have occurred when the local client device 106 registered the player input as opposed to when the game platform instance 206 received notification of the player input. This treats local player input more like a networked player (which, technically, the local player is) and can provide a better experience for the player.

As represented by block 416, a facilitating aspect for peer-to-peer multiplayer operation is the implementation of rollback and resimulation (also known as "replay") by each game simulation instance. Typically, the simulation is constantly rolling back and simulating forward as potentially large amounts of player input are sent across the messaging bus 108. In this sense, rollback can be approximated as an "undo" operation, while processing player input can be seen as operations on state. As such, any of a variety of techniques can be employed; one approach is to provide each operation with a corresponding undo operation. With this, the simulation can rollback to precisely the point where a new player input occurred, and no earlier, then process forward with a minimum number of operations. It will be appreciated that some counterpart undo operations may contain a significant amount of the simulation's state. As another approach, since the simulation has access to the starting state, the simulation can roll back to the beginning and then resimulate from there using all previous player input to re-simulate forward. Another technique utilizes the taking of periodic snapshots of the complete state of the simulation, and keeping all player input between these snapshots. To avoid memory fragmentation, a ring buffer can be employed for the snapshots, such that the oldest snapshots are eventually discarded and overwritten. When a new player input is received, a rollback is implemented in the simulation to the most recent snapshot created before the player input, and then the simulation processes all data forward. Because the simulation is not a text editor, older snapshots can be discarded; in fact, the system can elect to keep only one snapshot that is X milliseconds in the past, where X is some value beyond which the simulations would be declared out of sync and unrepairable. In this manner, only two copies of the state, the snapshot and the "current" estimate, need be maintained, and a rollback in this context thus means that the snapshot state is rolled back to the current state and simulated forward. Periodically, the snapshot state is advanced forward to X milliseconds in the past, and remote player input is discarded before that point.

Another factor, as represented by block 418, in facilitating multiplayer peer-to-peer operation is having the simulation run independently of the visualization and even separate from the system current time to ensure that the simulations run at the same rate. This is because visualizations on different instances may have different complexity levels, and thus the visualizations may run at different speeds and have different timings. Thus, to maintain determinism, each simulation is to run at the same rate and have each simulation tick occur at the same time. To illustrate, assume this was not the case. If a monster NPC in the game world notices a player when the player is within a certain distance of the monster NPC, when (and possibly whether) that monster NPC attacks would differ between simulations if that distance calculation did not occur at exactly the same time across simulations.

Thus, to provide this synchronicity, in one embodiment the simulation is decoupled from the actual time on the game platform instance 206 on which it runs, and the simulations can be calculated as if they had run at a particular rate and particular times. As an example, assume a simulation that is intended to run every 100 ms, starting at 0 ms. So, an idealized case is: (1) 0 ms: State 0; (2) 100 ms: State 1; (3) 200 ms: State 2, and so forth. However, suppose the calls for the simulation occur at 12 ms, 97 ms, 103 ms, 210 ms, 415 ms, and the like. Any missing simulations states can be calculated from the past, but not the future. As a result, the resulting situation exhibits: (1) 12 ms: State 0; (2) 97 ms: State 0 (no change); (3) 103 ms: State 1; (4) 210 ms: State 2; (5) 415 ms: State 3, State 4 (State 3 is calculated, then State4 rapidly afterwards); and so forth. Thus, by decoupling the simulation not only from the visualization but from the latency when the simulation code might have been called, each simulation instance is more likely to process (eventually) exactly the same data at exactly the same time points (with time being measured in the simulation), keeping each simulation consistent. So, while each simulation may be slightly out of sync with each other at any particular point in real-time, eventually all the simulations correct the variances and are off by only some order of hundreds of milliseconds. As an example of the impact of this approach, assume there is an artificial intelligence (AI) agent that detects another player, gets offended by the player's existence, and throws a water balloon. If the player appears at 50 ms, every simulation will notice the player at the 100 ms mark and launch the balloon at the same time. If, however, the simulations executed their ticks inconsistently, then when the player puts up a shield at 175 ms, different simulations instances may well have the player soaked or not soaked if the water balloon takes, for example, 100 ms to reach the player. Determinism can only be maintained if each simulation calculates the same things at the same intervals.

As such, in at least one embodiment, the rollback/update process of the update includes: (1) evaluate the list of player inputs to identify the one furthest in the past; (2) rollback, if appropriate, the state to a point before the identified earliest player input; (3) resimulate forward to the most recent update; (4) when the state is up to date with the last update, (a) apply all player input that has occurred since the last update, but before the current update; (b) apply any simulation logic (e.g., AI, physics, etc.).

It will be appreciated that calculating the simulation state and constantly rewinding and playing forward the simulation with each player's input is resource intensive. However, the simulation typically is configured to run at full speed as the rest of the system depends on full-speed simulation. Accordingly, in some embodiments, each simulation is executed as its own separate thread with its set of one or more separate cores of the CPU 304. To reduce computational load, in some instances rather than performing the rollback and resimulate forward process for each and every player input, player input for a full video frame (e.g., at 33 ms or 17 ms for a 30 frames per second or 60 frame per second frame rate, respectively) and only perform the rollback/simulate forward process at most once per frame.

Yet another factor in deterministic simulation with effective rollback, is the management of player state as represented by block 420. This includes maintaining persistent player state, as well as determining the initial player state. For maintaining a persistent player state, in some embodiments the conventional single player save state routines employed by a cloud gaming system can be used to maintain player state across separate launches of the game. This can include, for example, storing the current player state to a cloud drive or other cloud-attached storage. As for initial player state, when a player enters a region 210 where there are already players interacting with the environment (and may have been for an arbitrarily long period of time), determining the initial player state can be problematic. In one approach, the initial player state is determined by obtaining all player input since the beginning, applying those inputs to the simulation and run it forward. However, the history of everything that's occurred can dwarf the simulation state when the game has been active for a long period of time, or when there is a relatively high number of players active in the game. Accordingly, in other implementations, when a player enters a region 210, the player simulation instance can obtain the current state from one of the existing player's simulation instance, while also receiving updates from all players in the same region 210. The current state from the existing player typically is sufficiently far in the past that it contains the effects of all the player input up to that point, but soon enough that the player's simulation will be able to obtain all of the player input updates from other simulations. An example of this approach includes: (1) subscribe to player inputs for the region 210 via the messaging bus 108; (2) request for one of the other simulation instances to send its state. (3) another simulation sends its state to the requesting simulation—this state can include the recent simulation data stored for rollback (i.e., highly confident that it has all of the player inputs up until that point) and all of the player inputs from other players received since that data was collected; (4) the new player simulation instance receives this data, uses the simulation data as its source of truth, merges the player input from the other instance with what it's received, culling duplicates; and proceed with the gameplay as normal.

Next, as represented by block 422, another aspect for facilitating massive multiplayer gameplay in the peer-to-peer network context of the cloud gaming system 100 is that the visualization of the game (as provided by the visualization module 330, FIG. 3) is driven by the simulation (as provided by the simulation management module 328, FIG. 3), while the visualization has little or no influence on the simulation. This is in contrast to the conventional approach of many games that are driven by the visualization. In this sense, frame rate can often affect things as basic as physics and player input. Effects and objects on screen affect things like collision which can then affect things like the location of players and damage effects. Animations can affect the timing of when actions occur (the windup of a punch or reloading a gun). To this end, in at least one embodiment the simulation drives everything, and is the authoritative source of truth. Accordingly, what happens on screen reflects what the simulation understands is the current truth, and the simulation can change what the current and recent truth is at any moment, and, in fact, is likely to constantly do so. So, the visualization has to constantly adjust to the changing state of the simulation, rather than the other way around.

To illustrate, suppose in a multiplayer fighting game a player initiates a roundhouse attack that takes a second to wind up before the attack hits another player. If the latency between the first player's instance and the other player's instance is 200 ms, then the following might occur: (1) 0 ms—player 1 initiates the roundhouse attack; (2) 200 ms the simulation instance for player 2 receives notification that the roundhouse attack has started; (3) 900 ms—player 2 initiates a defense that deflects the attack; (4) 1000 ms—the simulation instance for player 1 begins the successful hit animation and applies damage to player 2; (5) 1100 ms—the simulation instance for player 1 receives the player input from player 2 for the defense, and notes it occurred 200 ms earlier; (6) in response, the simulation is rewound to 900 ms, which includes setting the health of player 2 to the level it was at 900 ms, and rewinding all animations to that point; (7) the deflect defense is applied; (8) the simulation is then wound forward to 1100 ms and instead of a hit animation, the gameplay is now in the middle of a successful block animation. Thus, in terms of the visualization of the game: the hit animation is stopped, and the deflect animation is run until it is at the current moment, which is 200 ms into the animation; any damage effects from the roundhouse hit are removed from the screen; and any block effects are put onto the screen, fast-forwarded 200 ms into them. In this above example, the simulation and visualization might have to insert the successful block animation, pull out the hit effects and insert in the block effects at their current state. However, there may be circumstances where the visualization is configured to more subtly morph the visual state over time to better match what really occurred in the simulation. The less often the visualization includes something jerky in the visual representation, the more the player is able to focus on the gameplay instead of focusing on visual artifacts.

In some embodiments, certain aspects of the techniques described above may implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A cloud gaming system comprising:
a messaging bus; and
a plurality of servers that are interconnected via the messaging bus and that are each communicatively coupled via one or more networks to one or more client devices;
wherein each server executes a game simulation instance for each of one or more players of a plurality of players, each respective player associated with one of the one or more client devices;
wherein each game simulation instance associated with a respective player within a specified region of a game world communicates player input by the respective player to one or more other game simulation instances via an ad-hoc peer-to-peer network formed between multiple game simulation instances associated with players within the specified region; and
wherein each respective game simulation instance associated with a player within the specified region calculates a current state for the respective game simulation instance based on player inputs received via the ad-hoc peer-to-peer network.

2. The cloud gaming system of claim 1, wherein each game simulation instance associated with a respective player within the specified region of the game world further communicates player input by the respective player to one or more additional game simulation instances that are each respectively associated with an additional player within an additional region of the game world that is adjacent to the specified region.

3. The cloud gaming system of claim 1, wherein a first region of the game world is associated with a first ad-hoc peer-to-peer network, and wherein to execute a first game simulation instance associated with a first player within the first region of the game world includes, responsive to one or more indications of a second player entering the first region from a second region, to facilitate a second game simulation instance that is associated with the second player to join the first ad-hoc peer-to-peer network.

4. The cloud gaming system of claim 3, wherein to facilitate the second game simulation instance to join the first ad-hoc peer-to-peer network includes to provide information regarding the current state for the first game simulation instance to the second game simulation instance.

5. The cloud gaming system of claim 4, wherein to provide the information regarding the current state for the first game simulation instance is performed in response to a request from the second game simulation instance.

6. The cloud gaming system of claim 4, wherein to facilitate the second game simulation instance to join the first ad-hoc peer-to-peer network further includes to communicate to the second game simulation instance one or more player inputs received by the first game simulation instance since the current state for the first game simulation instance was calculated.

7. The cloud gaming system of claim 1, wherein gameplay for the game world is dependent on player input and (a) gameplay for the specified region reverts to a default state when all players leave the specified region and/or (b) the state for the specified region is stored to a cloud drive or other network-accessible storage when the last player leaves the specified region.

8. The cloud gaming system of claim 1, wherein each respective game simulation instance stores one or more snapshots of state information for the respective game simulation instance, and wherein to calculate a current state for the respective game simulation instance based on player inputs includes to roll back the current state of the respective game simulation instance to a most recent one of the one or more snapshots of state information responsive to receiving a player input.

9. The cloud gaming system of claim 1, wherein to calculate a current state for the respective game simulation instance based on player inputs received via the ad-hoc peer-to-peer network includes to:
evaluate multiple player inputs to identify an earliest player input of the multiple player inputs;
modify the current state for the respective game simulation instance to a previous state that is associated with a time prior to the identified earliest player input; and
process the multiple player inputs in a chronological order.

10. The cloud gaming system of claim 9, wherein to calculate the current state further includes, after processing the multiple player inputs in the chronological order, to process any additional player input received since a latest player input of the multiple player inputs.

11. The cloud gaming system of claim 9, wherein to process the multiple player inputs in the chronological order includes to process the multiple player inputs based on a respective timestamp associated with each of the multiple player inputs.

12. A method, comprising:
executing, at one or more servers of a plurality of servers coupled via a messaging bus, a game simulation instance for each of one or more respective players of a plurality of players, the executing of each respective game simulation instance including:
communicating player input by the respective player to one or more other game simulation instances via an ad-hoc peer-to-peer network formed between multiple game simulation instances associated with players within a specified region of a game world;
receiving player inputs via the ad-hoc peer-to-peer network; and
calculating a current state for the respective game simulation instance based on the player input by the respective player and on the received player inputs.

13. The method of claim 12, wherein executing each respective game simulation instance further includes communicating player input by the respective player to one or more additional game simulation instances that are each respectively associated with an additional player within an additional region of the game world that is adjacent to the specified region.

14. The method of claim 12, wherein executing at least one of the respective game simulation instances further includes, responsive to one or more indications of an additional player entering the specified region, facilitating an additional game simulation instance to join the ad-hoc peer-to-peer network, the additional game simulation instance being associated with the additional player.

15. The method of claim 14, wherein facilitating the additional game simulation instance to join the ad-hoc peer-to-peer network includes providing information regarding the current state for the at least one respective game simulation instance to the additional game simulation instance.

16. The method of claim 15, wherein providing the information regarding the current state for the at least one respective game simulation instance is performed in response to a request from the additional game simulation instance.

17. The method of claim 15, wherein facilitating the additional game simulation instance to join the ad-hoc peer-to-peer network further includes communicating to the additional game simulation instance one or more player inputs received by the at least one respective game simulation instance since the current state for the at least one respective game simulation instance was calculated.

18. The method of claim 12, wherein executing each respective game simulation instance further includes storing one or more snapshots of state information for the respective game simulation instance, and wherein calculating a current state for the respective game simulation instance based on player inputs includes rolling back the current state of the respective game simulation instance to a most recent one of the one or more snapshots of state information responsive to receiving a player input.

19. The method of claim 12, wherein calculating a current state for the respective game simulation instance based on player inputs includes:
identifying an earliest player input of multiple player inputs;
modifying the current state for the respective game simulation instance to a previous state that is associated with a time prior to the identified earliest player input; and
processing the multiple player inputs in a chronological order.

20. The method of claim 19, wherein calculating the current state further includes, after processing the multiple player inputs in the chronological order, processing any additional player input received since a latest player input of the multiple player inputs.

21. The method of claim 19, wherein processing the multiple player inputs in the chronological order includes processing the multiple player inputs based on a respective timestamp associated with each of the multiple player inputs.

22. A gaming server, comprising
one or more processors;
one or more memories storing executable instructions configured to manipulate at least one of the one or more processors;
a network interface communicatively coupled to a messaging bus and to one or more client devices;
a simulation management module to execute a first game simulation instance for a first player associated with a first client device of the one or more client devices, and to communicate player input by the first player to one or more other game simulation instances via a first ad-hoc peer-to-peer network formed between multiple game simulation instances associated with players within a specified region of a game world; and
a state management module to receive indications of player inputs via the first ad-hoc peer-to-peer network, and to calculate a current state for the first game simulation instance based on the indications of the player inputs.

23. The gaming server of claim 22, wherein the simulation management module is further to communicate player input by the first player to one or more additional game simulation instances that are each respectively associated with an additional player within an additional region of the game world that is adjacent to the specified region.

24. The gaming server of claim 22, wherein the player is within a first region of the game world that is associated with the first ad-hoc peer-to-peer network, and wherein the state management module is further to facilitate, responsive to one or more indications of a second player entering the first region from a second region, a second game simulation instance that is associated with the second player to join the first ad-hoc peer-to-peer network.

25. The gaming server of claim 24, wherein to facilitate the second game simulation instance to join the first ad-hoc peer-to-peer network includes to provide information regarding the current state for the first game simulation instance to the second game simulation instance.

26. The gaming server of claim 25, wherein to provide the information regarding the current state for the first game simulation instance is performed in response to a request from the second game simulation instance.

27. The gaming server of claim 25, wherein to facilitate the second game simulation instance to join the first ad-hoc peer-to-peer network further includes to communicate to the second game simulation instance one or more player inputs received by the first game simulation instance since the current state for the first game simulation instance was calculated.

28. The gaming server of claim 22, wherein the simulation management module is further to store one or more snapshots of state information for the first game simulation instance, and wherein to calculate a current state for the first game simulation instance based on player inputs includes to roll back the current state of the first game simulation instance to a most recent one of the one or more snapshots of state information responsive to receiving a player input.

29. The gaming server of claim 22, wherein to calculate a current state for the first game simulation instance based on player inputs received via the first ad-hoc peer-to-peer network includes to:
evaluate multiple player inputs to identify an earliest player input of the multiple player inputs;
modify the current state for the first game simulation instance to a previous state that is associated with a time prior to the identified earliest player input; and
process the multiple player inputs in a chronological order.

30. The gaming server of claim 29, wherein to calculate the current state further includes, after processing the multiple player inputs in the chronological order, to process any additional player input received since a latest player input of the multiple player inputs.

31. The gaming server of claim 29, wherein to process the multiple player inputs in the chronological order includes to process the multiple player inputs based on a respective timestamp associated with each of the multiple player inputs.

* * * * *